Oct. 11, 1960
F. B. SHAW ET AL
2,955,364
CHALKBOARDS
Filed Oct. 8, 1956
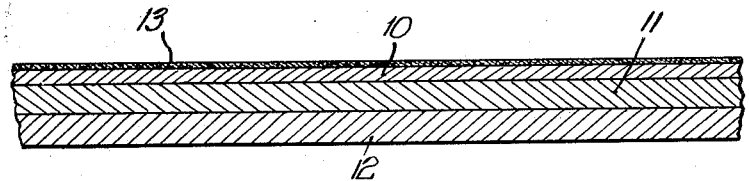
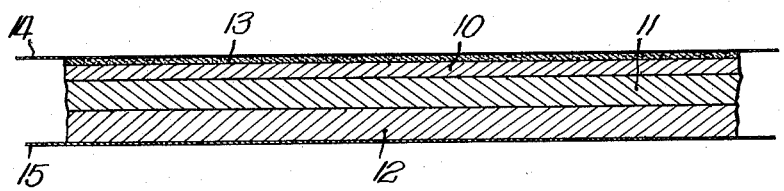
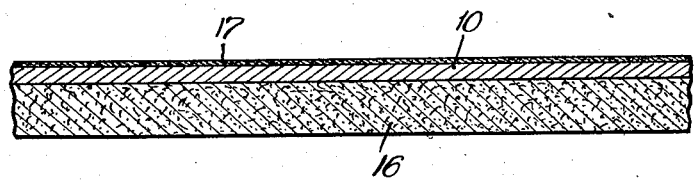
INVENTORS.
Fred B. Shaw,
BY John R. Guenther,
Jack S. Schlueter,
Cromwell, Greist + Warden
attys.

United States Patent Office 2,955,364
Patented Oct. 11, 1960

2,955,364
CHALKBOARDS

Fred B. Shaw, Bayside, and Jack S. Schlueter and John R. Guenther, Milwaukee, Wis., assignors to Continental Can Company, Inc., New York, N.Y., a corporation of New York Filed Oct. 8, 1956, Ser. No. 614,479

3 Claims. (Cl. 35—66)

The present invention relates to a new and improved type of chalkboard formed from bibulous sheet material impregnated with a solid organic plastic. More particularly, the present invention is directed to the provision of an improved organic plastic chalkboard and process of forming the same, the chalkboard being made from polyester resins of a type to be described and provided with a polyester overlay surface portion which is internally reinforced by the inclusion therein of dispersed finely ground material.

Chalkboards are now and have been primarily manufactured from slate, painted hardboard surfaces, opaque glass, and porcelain enameled metal. Each of these basic types of chalkboards is objectionable in at least one respect either in connection with the manufacturing of the same or subsequent installation and use. Slate, for example, being limited to the well known black color, is somewhat limited in use due to its availability in only moderately sized sheets and, further, due to the difficulties encountered in installing the slate because of its relative fragility. Still further, slate, as in the case of all natural products, is quite variable in quality and this among other characteristics places slate in the category of expensive material.

Painted hardboard surfaces are readily prepared in any color and the manufacturing of the same is relatively simplified by use of a paint spraying process. Painted hardboard surfaces are inexpensive and readily available on the present market and, consequently, are widely used. While a good initial surface appearance can be obtained with this type of chalkboard, the surface is comparatively soft, as is common with many different types of painted surfaces, and consequently the painted hardboard surface has very limited resistance to wear, solvents and corrosive chemicals. Still further, various types of hardboard adapted for painting to provide a chank-retaining and eraseable surface are generally avaliable in sizes which are limited which restricts the usefulness of this type of chalkboard.

Opaque glass with one frosted face can also be made available in almost any color and is wear-resistant to a desirable extent. However, glass chalkboards of this type are limited in size, extremely expensive, fragile, and difficult to install. Porcelain enameled steel with a matte surface exhibits substantially all of the desirable characteristics of opaque glass while eliminating the undesirable characteristic of fragility. However, porcelain enameling is an expensive process and has limited resistance to the action of corrosive chemicals.

With the advent and widespread use of organic plastics in many different fields, efforts have been made to provide chalkboards molded or cast from thermoplastic resins such as polymethyl methacrylate for the purpose of improving on the physical and chemical properties of commercial forms of chalkboards. However, in the case of molded or cast thermoplastic resins it has been found that the manufacture of chalkboards is overly expensive and these boards are limited as to size and are further unsatisfactory in connection with resistance to wear and solvents. High pressure laminates have been tested in connection with their suitability for use as chalkboards but the principal problem confronting these latter efforts resides in the provision of a uniform, satisfactory writing surface. Still further, chalkboards manufactured in this manner are limited in sheet size due to press limitations.

With continued investigations made in the organic plastic resin field, continuous processes such as those disclosed in United States Patent No. 2,496,911 and United States Patent No. 2,528,152 have been found capable of producing organic plastic laminates which are unlimited in size. In continuously forming this type of laminate, polyester resins (hereinafter specified generally as polymerized polyhydric alcohol esters of unsaturated dibasic acids) have been utilized in the impregnating of the fibrous sheet material which is subsequently laminated in a continuous manner, the polyester resin being polymerized to a rigid or flexible thermoset structure without the evolution of any volatile by-product whatsoever. The outstanding characteristic of the polyester resins resides in the non-volatile polymerization step which makes continuous production of laminates possible. Without the presence of a volatile by-product it is unnecessary to apply pressure during the curing cycle such as is necessary in curing many other types of resins, as, for example, the phenolic, melamine and urea types. While it is possible to manufacture continuous laminates or sheets from thermoplastic resins, such as the vinyls, polystyrene, methacrylates and cellulose acetate by extruding or coating with the molten polymer, these plastic materials are devoid of the surface hardness, wear resistance, dimensional stability, solvent and corrosion resistance, heat resistance, and permanency of the thermosetting resins such as the polyesters.

A polyester resin for the purpose of the present invention is a complex product normally prepared by polymerizing the polyhydric alcohol esters of unsaturated dibasic acids. Typical polyhydric alcohols are ethylene glycol, diethylene glycol, propylene glycol, glycerine, erythritol, pentaerythritol, butylene glycols, sorbitol, and mannitol. Typical unsaturated dibasic acids are maleic, fumaric, and itaconic. The properties of these resins may be modified to obtain variations in ultimate properties by the use of substituted polyhydric alcohols and unsaturated dibasic acids (those in which one or more hydrogen atoms per molecule have been replaced with another element or an organic radical), and by the replacement of a portion of the unsaturated dibasic acids with saturated dibasic acids, such as phthalic, terephthalic, adipic, sebacic, and tetrachlorophthalic, or with chlorendic acid which, though unsaturated, behaves like a saturated compound with respect to polymerization. By these substitutions, resins which yield rigid, flexible, fire-resistant or other properties may be obtained.

Resins of the type described may be either thermoplastic, as where the chain-like polymeric ester molecules are not connected to one another, or thermosetting, in the instance where the chain-like polymeric polyester molecules are interconnected or crosslinked to one another. Commercial polyester resins are usually marketed in an incompletely polymerized form (liquid resin) by their manufacturers and users of these resins can then cure them by advancing the degree of polymerization in a laminating, casting or molding operation. As previously described, no volatile by-products result during this cure. Crosslinking the liquid polyester resin molecules by means of monomeric unsaturated molecules such as styrene, methyl styrene, vinyl acetate and methyl methacrylate impart good physical properties to the resin. Because of the generally better results obtained with styrene and the economic advantages inherent in its use, this crosslinking monomer is most commonly used. Consequently, the great majority of all commercially available liquid polyester resins are actually solutions of such resins in monomeric styrene.

In generally considering the continuous process of Patent No. 2,496,911, bibulous sheet material is impregnated with liquid organic plastic, such as a polyester resin, and any desired number of plies of the impregnated sheet material are brought together to form a laminate in a continuous manner. The sheet material used may include any natural or artificial material which exists in fibrous form to provide bibulous plastic reinforcement. Reinforcements of prime importance are natural kraft papers, bleached kraft papers, cotton linters and purified alpha cellulose papers. To be adapted for use in the continuous laminating process, the thicker core paper must preferably have better than average mechanical properties, be substantially uniform in caliper and composition, and have a pore structure that will allow for ready impregnation by the resin. The facing sheet may be pigmented or otherwise colored depending upon the desired color of the final product and such pigmentation is readily observable due to the transparency of the polyester resins. Once the desired laminate is formed, a nonbibulous sheet material is used to cover the exposed surfaces of the same so as to retain the shape of the laminated sheet during polymerization and, further, provide the exposed surfaces of the same with the type of finish desired. Polymerization is completed by the application of heat in any suitable manner such as disclosed in the above identified patent.

In using the continuous process it is possible to maintain a much closer tolerance in the over-all product as the material forming the product is passed through a set of combining rollers. Once a roll setting is made, the material is uniformly handled throughout any one continuous area. The resultant polyester laminate is readily adapted for many different uses. Such uses include insulation, building materials, luggage covering, advertising displays, etc. As the polyester resins contain no plasticizers, there is no volatile component to escape over a period of years during the use of the laminate. Still further, due to the completion of polymerization and the presence of a thermoset state, subsequent change in the molecular structure does not take place and no change in physical properties are observable over an extended period of time. Polyester resin laminates are adapted to withstand elevated temperatures, are highly resistant to wear, and are resistant to a wide range of chemicals and food products.

Due to the presence of the aforementioned desirable properties in polyester resin laminates, and, further, due to the adaptability of these laminates in being formed in a continuous manner thereby eliminating size restrictions, it has been found that by treating the polyester resin laminates in a manner to be described during the continuous formation thereof, a new and improved chalkboard can be continuously fabricated and formed. The chalkboard exhibits the necessary desirable physical and chemical characteristics of existing chalkboards while at the same time overcoming or not exhibiting the various undesirable features or limitations presently encountered in the manufacture and use of chalkboards.

It is, therefore, an object of the present invention to provide a new and improved organic plastic chalkboard formed from a polymerized polyester resin reinforced with fibrous sheet material, which chalkboard exhibits over-all composite properties of an improved and lasting nature.

A further object is to provide a new and improved polyester resin chalkboard laminate having a resin overlay surface portion internally reinforced with finely ground material, the exposed face of the overlay surface portion being provided with a matte finish which is chalk-retaining while being readily eraseable.

Another object is to provide a chalkboard formed from polymerized polyester resin reinforced with bibulous material and being provided with a polymerized resin overlay surface portion exhibiting the desired chemical and physical properties of an appropriate chalk-retaining and eraseable surface, the reinforced polymerized resin chalkboard being adapted for manufacture in either rigid or flexible form and being further readily adapted for mounting on any desirable backing material.

Still a further object is to provide a new and improved chalkboard formed from polymerized polyester resin laminate provided with a polymerized polyester resin overlay surface portion in which is dispersed finely ground glass and the writing face of which is provided with a flat, uniform, dull finish which is smooth to the touch and which diffuses reflected light uniformly to eliminate observable glare even at a low angle of refraction.

An additional object is to provide a process of forming a polyester resin chalkboard laminate which includes steps which can be continuously followed so as to provide uninterrupted operation in the forming of continuous sheets of chalkboard-forming material.

Other objects not specifically set forth will become apparent from the following detailed description.

In the accompanying drawing,

Figs. 1, 2 and 3 are enlarged diagrammatic sectional views of various forms of laminates of the types to be described.

The chalkboard of the present invention as previously described is formed from polymerized polyester resin which in its liquid state has been reinforced by one or more plies of bibulous sheet material and which further has been provided with an overlay surface portion of polyester resin throughout which has been dispersed finely ground reinforcing material. The writing face of the chalkboard, being the exposed surface of the overlay portion, provides a wear and abuse-resistant writing surface which is easily erased and which has minimum shine or glare, both as manufactured and after extended continuous use. This type of chalkboard is readily adapted for manufacture in a continuous manner as discussed above and as disclosed in the aforementioned patents. Consequently, any desired thickness of chalkboard may be produced and the chalkboard may be manufactured as either a rigid or resilient sheet in any desired color as will subsequently be described. Chalkboards of this type are readily backed up with relatively inexpensive material such as masonite, plywood, etc. to obtain the structural rigidity required in use. The chalkboard may be adhered to a backing in the factory and thus sold as mounted sheets or it may be applied to the backing at the site of installation so as to obtain the advantages of a continuous, joint-free writing surface.

In forming the chalkboard of the present invention any suitable process can be followed which will provide a reinforced polymerized polyester resin sheet provided with a polymerized polyester resin overlay having dispersed therein a quantity of finely ground reinforcing material such as glass. By referring to glass it is intended to cover an amorphous transparent or translucent brittle material usually made by fusion of silica, soda ash and salt cake or similar materials. Preferably, the continuous types of processes disclosed in the above identified patents are basically used so as to overcome restrictions as to sheet size while at the same time provide uniformity of product. One or more sheets of reinforcing or bulk-providing material, such as kraft paper, alpha cellulose paper or cotton linters, are impregnated with liquid polyester resin formulation. This formulation may be either a rigid type polyesters resin or a flexible type polyester resin depending upon the physical characteristics desired in the end product. The resin formulation will generally consist of a polyester in styrene solution and include a suitable polymerization catalyst such as a peroxide. The thickness of the end product will depend primarily upon the number of plies of impregnated sheets used and impregnation of these sheets may be brought about in any suitable manner.

As an example of obtaining impregnation, each sheet may be continuously run through a body of liquid polyester resin formulation and subsequently joined together in face-to-face relation to form a laminate. Some of the sheets may be impregnated and joined with unimpregnated sheets, the excess polyester resin formulation functioning to impregnate the additional sheets combined thereby. This latter procedure is adapted for use where an extremely porous paper, such as cotton linters, is used as reinforcing paper. The impregnated reinforcing sheets are combined by the use of rollers and the thickness of the laminated plies are controlled by the setting of the rollers. Following the formation of the laminate, a surface of the same is passed through a portion of liquid polyester resin formulation which has dispersed throughout therein finely ground glass or any other suitable reinforcing, abrasive material. Thus, an overlay surface portion which should not exceed 0.005 of an inch in thickness is applied to a surface of the uncured laminate, the thickness of the overlay portion being controlled by the passing of the treated laminate through a pair or pairs of rollers of a predetermined spaced setting.

Fig. 1 diagrammatically illustrates a laminate formed from a plurality of reinforcing plies 10, 11 and 12, the ply 10 being a thin facing sheet of the type described in the examples below. The top surface of the laminate is provided with an overlay portion 13 having dispersed within the same finely ground particles of glass. Of course, in the illustration of Fig. 1 the thickness of the overlay 13 is exaggerated to better illustrate the formation of the chalkboard of the present invention.

At this stage of the process a non-bibulous covering material is used to cover both the top and bottom of the laminate so as to encase the same during polymerization of the polyester resin formulation. This arrangement is diagrammatically shown in Fig. 2 where sheets 14 and 15 are used to cover the laminate. The non-bibulous encasing material in contact with the exposed face of the overlay resin, such as the sheet 14 in Fig. 2, should be parchmentized paper capable of providing the overlay resin with a surface finish essentially identical to the writing surface finish desired on the chalkboard. The parchment used must have a uniform, matte surface, the degree of which is capable of providing a flat, uniform, dull surface on the overlay which feels smooth to the touch but diffuses reflected light so uniformly that no glare is apparent even at a low angle of refraction. The parchmentized covering material is plasticized as, for example, with glycerine and water, and must separate or peel from the finished product following polymerization of the polyester resin formulation. This covering material must also be essentially non-porous, be free of "ropy" areas, and have sufficient strength to carry the weight of the laminate through the ovens or other polymerization equipment. The parchmentized paper must obviously be easily wetted by the liquid resin in order to provide the degree of matte desired.

Following encasing of the laminate, the entire assembly is carried on tenter clamps through a series of progressively hotter ovens in the event that the process described in Patent No. 2,496,911 is followed. The cured laminate issuing from the terminal end of the oven is stripped of its encasing webs and either wound into rolls or sheared to desired sheet lengths. It may be passed through a sanding machine to roughen the back surface to make it more adaptable for cementing to a supporting surface with an adhesive which requires a roughened surface.

In the mounting of the laminate to a supporting base, any suitable type of adhesive may be used. Due to the uniformity of sheet manufacture and the provision of a completely flat back surface, the laminated sheet may be readily applied to a substrate. Pressure is required only to maintain contact with the glue line and if the glue line has a pronounced initial "grab," as in the case of contact adhesives, no special pressure is necessary. Following the gluing operation, any excess laminate sheet material overhanging the edges or cutouts of the substrate may be rapidly trimmed with a file. Arduous sawing often necessary in connection with the use of traditional chalkboard materials is thus entirely avoided. The laminate sheet when formed from flexible polyester resin formulations may be readily coiled thereby allowing self-edging and further adapting the laminate sheet for mounting on contoured surfaces. The polyester resin chalkboard may be adhered to plaster, wallboard, plywood, masonite, or any similar backing material either in wall-to-wall lengths or in segments, as desired.

The principal aspects of the chalkboard of the present invention reside in its adaptability for continuous manufacture and the presence of a unique surface which provides a wear and abuse-resistant writing surface that is easily erased and has minimum shine or glare, both as manufactured and after extended continuous use. Such a surface is attained by the simultaneous use of a powdered-glass loaded overlay resin and a parchmentized paper of the correct texture. The presence of the dispersed powdered glass provides an improved wear resistance and resistance to gloss-up which is not found in known types of organic plastic chalkboards. Any suitable finely ground reinforcing material, such as glass, capable of providing the requisite physical properties may be used.

The following examples are illustrative of the organic plastic chalkboard and process of forming the same of the present invention and should not be construed as being limiting with respect thereto:

*Example 1*

A continuous sheet of green pigmented alpha cellulose paper having a thickness of approximately 0.008 of an inch was continuously impregnated with a peroxide catalyzed rigid polyester resin formulation consisting of approximately 65% of a glycol phthalate maleate and approximately 35% styrene. After a period of approximately 24 hours at 70° F., the thoroughly impregnated paper was placed on a continuous laminator and, after passing through one or more dip pans containing a similar resin formulation, was laminated with one or more plies of kraft paper which had also been passed through the same resin formulation for pre-impregnation thereby. The alpha cellulose paper formed the face sheet of the laminate which as illustrated in Fig. 1 is the ply 10. Immediately prior to the combining rolls effecting the lamination, an excess of the same polyester resin formulation filled with fine powdered glass of approximately 50 parts glass to 100 parts resin was applied to the top surface of the green facing sheet. On passing through the combining rolls the overlay resin was evenly distributed at a uniform thickness of approximately 0.005 of an inch. Simultaneously, the entire laminate including the overlay portion was encased top and bottom in non-porous parchmentized paper of the type capable of providing the face of the ovelay resin with a matte finish. The entire assembly was then carried on tenter clamps through a series of progressively hotter ovens in the manner described in Patent No. 2,496,911. Following polymerization the laminate was stripped of its covering material and was sheared to desired sheet lengths.

*Example 2*

A facing sheet of solid black alpha cellulose paper having a thickness of approximately 0.004 of an inch was pre-impregnated with a catalyzed resilient polyester resin formation consisting approximately of 25% of a glycol phthalate maleate and 50% styrene modified by 25% of a glycol adipate maleate. The impregnated facing sheet was then laminated with a number of core sheets in the manner described in Example 1 with the exception that the powdered glass containing the overlay surface portion was formed from the same resilient resin formulation. Parchmentized paper was applied to the top portion of the laminate to thus provide the top encasing web. The bottom encasing web was formed from glassine. Following polymerization as brought about in the same manner as described in Example 1, the parchmentized paper was stripped from the product and the glassine was removed by sanding.

*Example 3*

Example 1 was repeated with the exception that the continuous process described in Patent No. 2,528,152 was followed. As described in this patent, a heated arcuate platen was used in completing polymerization of the polyester resin formulation. In using the heated platen the laminated sheet was run with the overlay portion and facing sheet in contact with the top surface of the platen, the encased laminate being slidably moved over the platen to provide the desired ironing action while being advanced by rollers which maintained uniform tension on the covering sheets to retain the same in firm sliding engagement with the arcuate platen.

In referring to the examples it will be noted that a pigmented facing sheet was used in forming the chalkboard. The polymerized polyester resins being transparent allow the use of pigmented facing sheets providing the chalkboard with any desired color. Thus the chalkboard formed in accordance with the principles of the present invention may be made in many different colors to further improve the appearance of the chalkboard as well as adapt the same for varied uses. The glycol phthalate maleate is readily available commercially. Typical commercial resins are Selectron 5084 of the Pittsburgh Plate Glass Company and Paraplex P-43 of Rohm & Haas Company. This type of polyester resin is normally sold in a styrene solution of approximately 70% resin and 30% styrene. For optimum viscosity and rate of reaction additional styrene may be added as desired. The usual technique includes the addition of sufficient styrene to obtain a viscosity that works well with the particular reinforcements under impregnation. Such a viscosity falls generally within the range of about 200 to 1200 cps. The viscosity of the overlay resin will preferably be higher, such as within the range of about 5,000 to 25,000 cps. With respect to the glycol adipate maleate, saturated dicarboxylic acids other than adipic may be used to attain a flexible resin. Paraplex P-13 of the Rohm & Haas Company is such a flexible polyester resin. In formulating the flexible polyester resin the amount of flexible resin added to the rigid resin will vary depending on the relative flexibility desired. Generally, the amount of powdered glass used will fall within the range of about 15 to 100 parts for each 100 parts resin.

In place of the use of impregnated core material such as kraft paper, a non-bibulous rigid material such as masonite or plywood can be used. In this connection, the polyester resin overlay portion containing the disposed powdered glass and laminated to a colored face sheet 10 is laminated to the non-bibulous rigid material in following a modified continuous manufacturing process in forming the chalkboard. Such a product is diagrammatically illustrated in Fig. 3 where the masonite base 16 is laminated with the face sheet 10 and overlay 17.

Upon thorough testing of the chalkboards formed in the manner above described, it has been found that each product is provided with a good writing surface of controllable color which is wear-resistant, solvent-resistant, resistant to corrosive chemicals, and non-fragile. The chalkboards are readily installed, available in continuous lengths and produceable at a moderate cost.

Obviously, many modifications and variations of the invention as hereinbefore set forth may be made without departing from the spirit and scope thereof, and therefore only such limitations should be imposed as are indicated in the appended claims.

We claim:
1. A chalkboard formed from a polyester resin laminate and having a polyester resin overlay of a thickness not over 0.005 of an inch filled with reinforcing finely ground material, the exposed surface of said overlay being provided with a matte finish which is chalk-retaining while being readily eraseable, the polyester resin being the polymerization products of polyhydric alcohol esters of unsaturated dibasic acids.

2. The chalkboard of claim 1 formed from bibulous cellulosic sheet material of uniform density impregnated with a polymerized flexible polyester resin.

3. The chalkboard of claim 1 formed from bibulous cellulosic sheet material of uniform density impregnated with a polymerized rigid polyester resin.

References Cited in the file of this patent

UNITED STATES PATENTS

| | | |
|---|---|---|
| 1,756,393 | Snell | Apr. 29, 1930 |
| 2,112,762 | Chatfield | Mar. 29, 1938 |
| 2,264,244 | Lytle | Nov. 25, 1941 |
| 2,275,957 | Groff | Mar. 10, 1942 |
| 2,379,741 | Palmquist | July 3, 1945 |
| 2,452,235 | Gold | Oct. 26, 1948 |
| 2,496,911 | Green | Feb. 7, 1950 |
| 2,498,586 | Smith | Feb. 21, 1950 |
| 2,522,351 | Egolf | Sept. 12, 1950 |
| 2,528,152 | Landgraf | Oct. 31, 1950 |
| 2,541,497 | Buxbaum | Feb. 13, 1951 |